Nov. 28, 1967   D. B. EVANS ET AL   3,354,815
MACHINE FOR COOKING FOOD CHIP MATERIALS
Filed Aug. 8, 1966   3 Sheets-Sheet 1
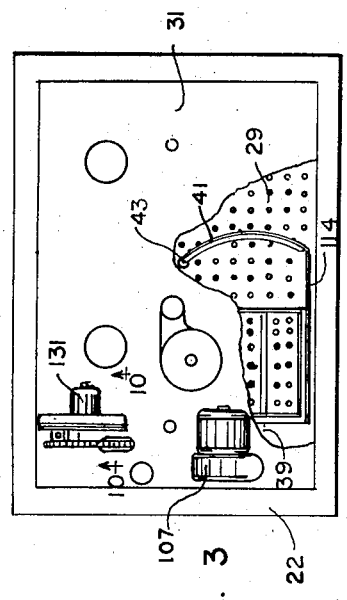
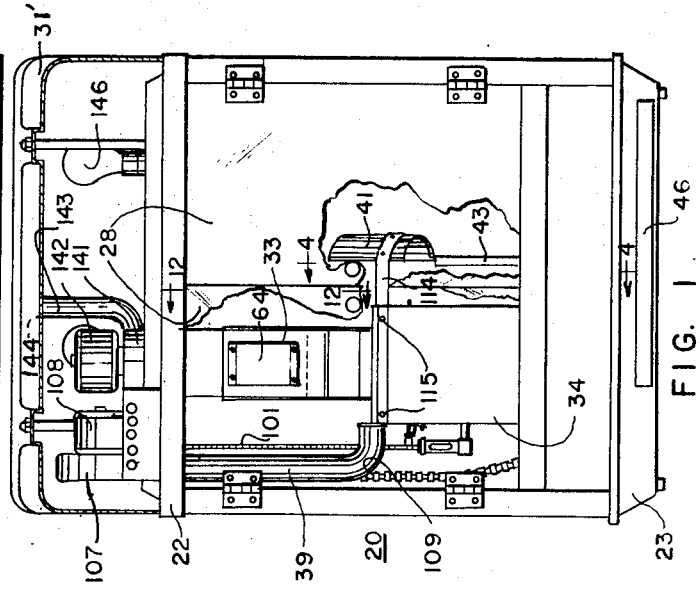
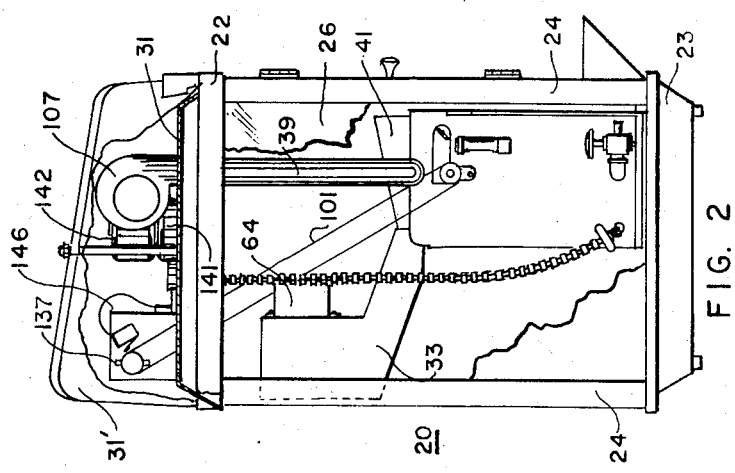
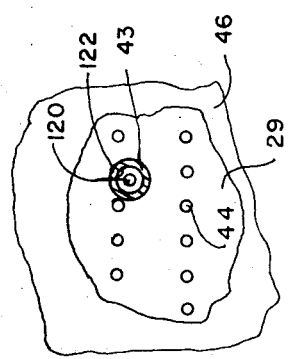
INVENTOR.
DAVID B. EVANS
JOHN C. EVANS
BY *Pearce & Schaeperklaus*
Attorneys

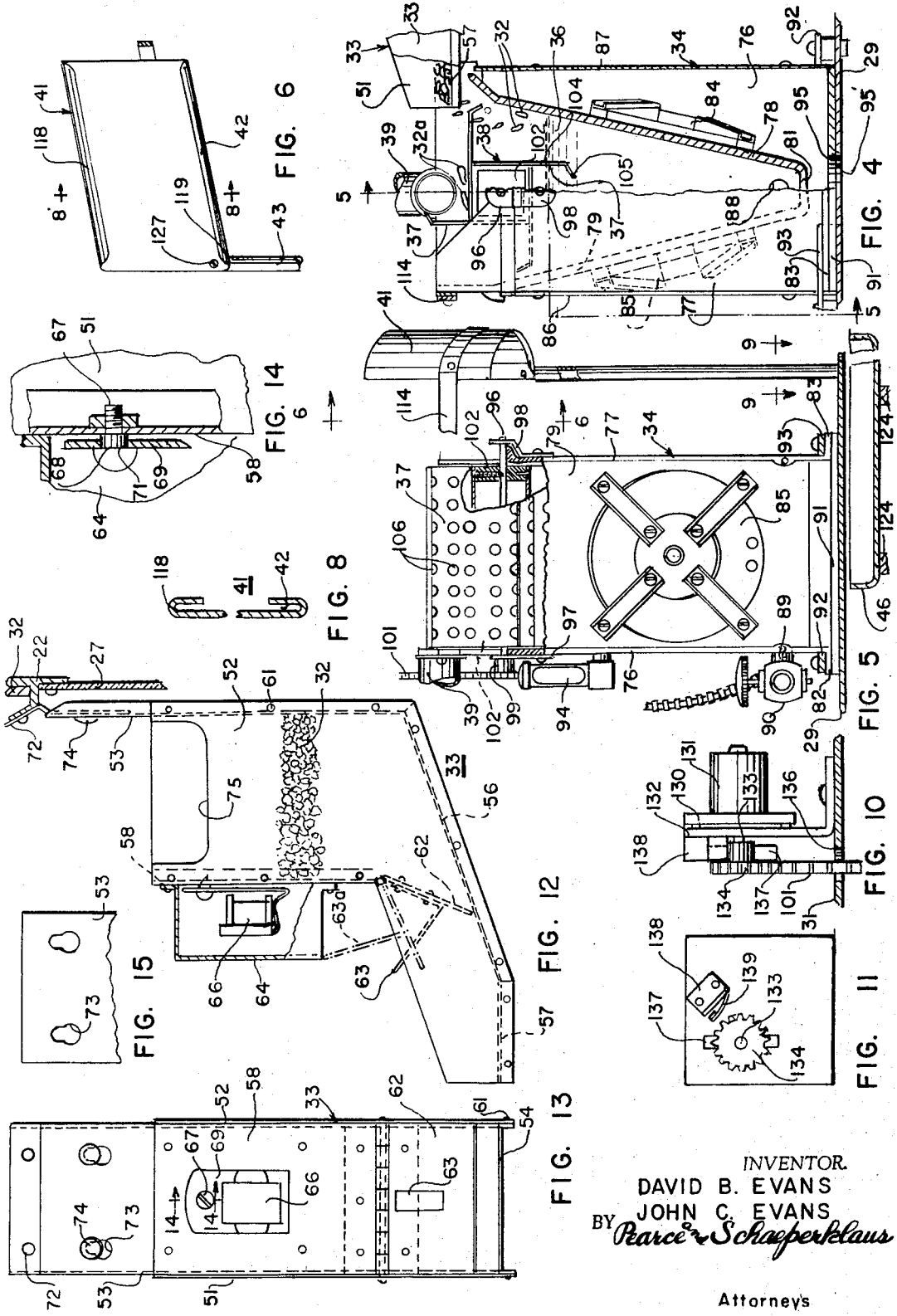

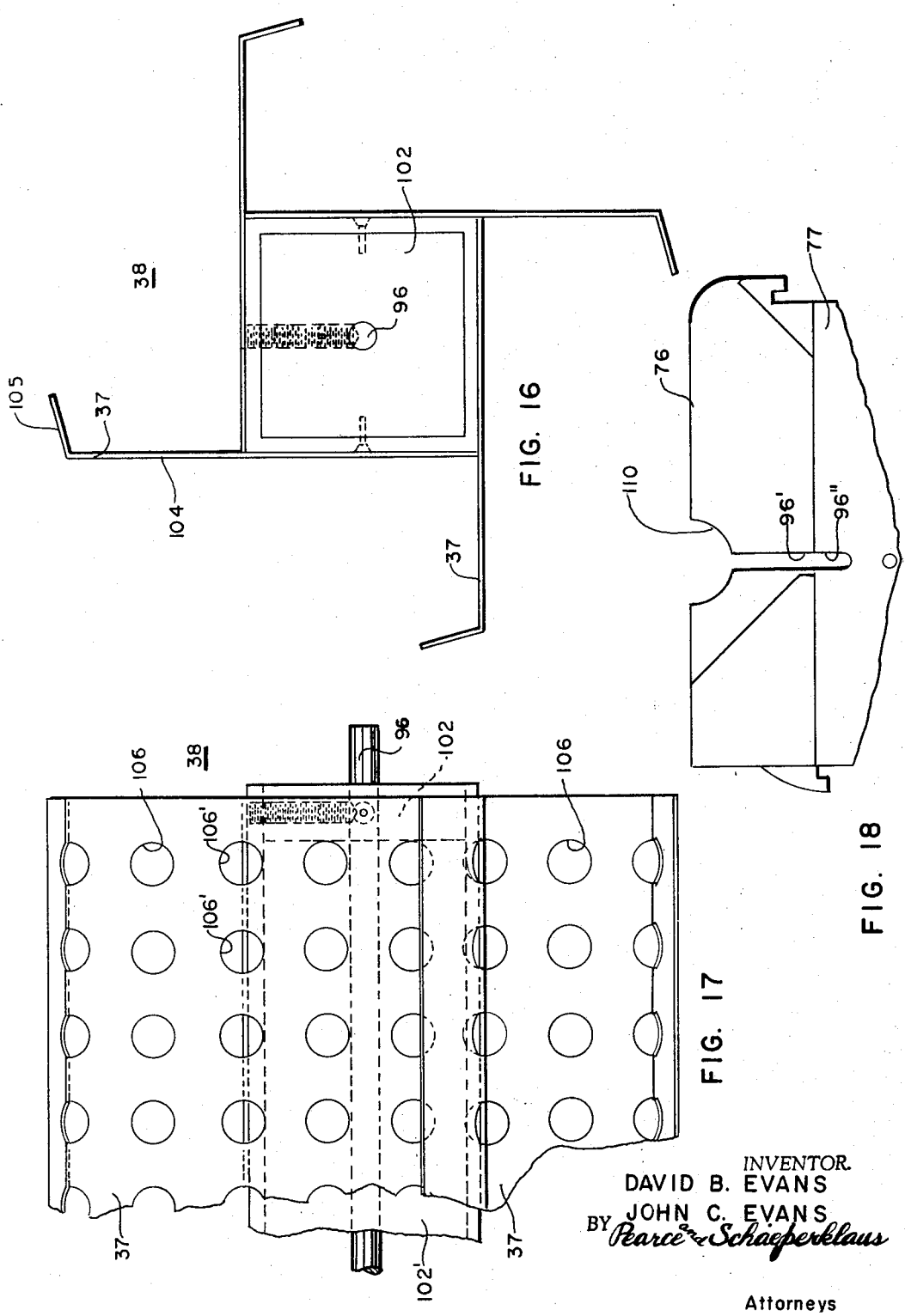

United States Patent Office 3,354,815
Patented Nov. 28, 1967

3,354,815
MACHINE FOR COOKING FOOD CHIP MATERIALS
David B. Evans, Sycamore Township, Hamilton County, and John C. Evans, Columbia Township, Hamilton County, Ohio, assignors to Gold Medal Products Co., Cincinnati, Ohio, a corporation of Ohio
Filed Aug. 8, 1966, Ser. No. 571,064
5 Claims. (Cl. 99—407)

ABSTRACT OF THE DISCLOSURE

A food chip cooking machine in which chips are dropped into a kettle to be cooked therein, rise to the surface of liquid in the kettle, are picked up by a rotating paddle, blown from the paddle by an air blast to be caught by a baffle and collected below the baffle.

---

This invention relates to a machine for deep frying cooking food chip materials and the like.

An object of this invention is to provide a machine which rapidly and automatically fries food chip materials.

A further object of this invention is to provide a machine of this type in which the food chip material is automatically fed from a hopper to a deep fry kettle by means of an agitating device which shakes or agitates the hopper to advance the chip material from the hopper to the deep fry kettle.

A further object of this invention is to provide such a machine which includes a deep fry kettle having a paddle device therein which urges the chips downwardly as they enter the deep fry kettle to sink below the level of hot oil in the kettle and which paddle raises the chips, once the chips have been cooked, to a position above the kettle.

A further object of this invention is to provide a machine of this type in which a blower blows the chips off the paddle in a substantially horizontal direction to discharge the chips from the kettle.

A further object of this invention is to provide such a machine which includes a baffle which receives the cooked chips and stops horizontal movement thereof as they are discharged by the blower.

A further object of this invention is to provide a machine of this type in which an oil trough along the lower edge of the baffle catches oil entrained on the chips which is separated therefrom at the baffle to direct the oil to a downspout at a lower end of the baffle.

The above and other objects and features of the invention will be apparent to those skilled in the art to which this invention pertains from the following detailed description and the drawings, in which:

FIG. 1 is a view in rear elevation of a chip cooking machine constructed in accordance with an embodiment of this invention, parts of a hood thereof being broken away to reveal internal construction;

FIG. 2 is a view in side elevation thereof, the hood being partially broken away to reveal internal construction;

FIG. 3 is a plan view thereof with the hood removed, parts of an upper plate thereof being broken away to reveal details of construction;

FIG. 4 is a view in side elevation of a kettle and a portion of a hopper thereof, parts being broken away to reveal internal construction;

FIG. 5 is a view in section taken generally on the line 5—5 in FIG. 4, closure panels of the kettle being removed;

FIG. 6 is a view in section taken on the line 6—6 in FIG. 5;

FIG. 7 is a view in side elevation of a downspout which forms a part of the machine;

FIG. 8 is a view in section on an enlarged scale taken on the line 8—8 in FIG. 6;

FIG. 9 is a view in section taken on the line 9—9 in FIG. 5;

FIG. 10 is a view in section taken on the line 10—10 in FIG. 3;

FIG. 11 is a view in side elevation of a timing mechanism of the machine, the timing mechanism being removed therefrom;

FIG. 12 is a view in section taken on the line 12—12 in FIG. 1, an open position of a door thereof being shown in dot-dash lines;

FIG. 13 is a view in rear elevation of the hopper and a hopper supporting plate;

FIG. 14 is a view in section taken on the line 14—14 in FIG. 13;

FIG. 15 is a fragmentary view in rear elevation of the upper portion of the hopper seen in FIG. 13;

FIG. 16 is a view in end elevation on an enlarged scale of a paddle wheel which forms a part of the machine;

FIG. 17 is a fragmentary view in side elevation of the paddle wheel shown in FIG. 16; and FIG. 18 is a fragmentary view in side elevation of the kettle shown in FIGS. 4 and 5, removed from the machine.

In the following detailed description, and the drawings, like reference characters indicate like parts.

In FIGS. 1 and 2 is shown a chip frying machine 20 constructed in accordance with an embodiment of this invention. The machine includes upper and lower frames 22 and 23 which are connected by upright corner struts 24. Transparent side panels 26, a transparent front panel 27 (FIG. 12), and transparent doors 28 hinged to corner struts define a box-like enclosure. A lower or bottom plate 29 (FIG. 4) is supported on the lower frame. A top plate 31 (FIG. 3) is supported by the upper frame 22. A translucent hood 31' is also carried by the upper frame 22 and encloses elements mounted on the upper plate or top plate 31.

Food chips 32 (FIG. 12) in a hopper 33 are fed from the hopper to a kettle 34 where the chips are received in a bath of heated oil 36 (FIG. 4) and are cooked therein. As the chips are cooked, they rise inside the bath of oil 36 in the kettle and are picked up by paddles 37 of a paddle wheel 38 and are carried to a raised position by the paddles. When the chips are at the raised position, a blast of air from an air pipe or blower tube 39 blows the chips off the paddle wheel and against the baffle 41 which catches and stops the chips. The chips fall to the bottom plate 29. Oil entrained on the chips is caught in a trough 42 formed integrally with the lower edge of the baffle 41 which directs the oil to a downspout 43. In addition, the lower plate 29 is provided with openings 44 through which any oil which falls to the lower plate 29 is released. A box-like oil catching receptacle or tray 46 mounted on the lower frame 23 below the bottom plate 29 receives the oil.

*The hopper*

The hopper 33 includes side wall plates 51 and 52 (FIG. 13). The side wall plates 51 and 52 are spanned by a channel-shaped base plate 53, a channel-shaped bottom plate 54 having a sloping portion 56 and a horizontal portion 57, and a channel-shaped face plate 58, the plates being attached together by rivets 61 to form a generally L-shaped hollow hopper having a horizontal discharge provided by the horizontal portion 57. A gate or door 62 is hinged to a lower edge of the face plate 58. A handle and stop arm 63 is attached to the gate 62. The arm 63 is engageable with a housing 64 which is mounted on the face plate 58, to limit opening of the gate in the position shown in dot-dash lines at 63a in FIG. 12. The housing 64 encloses an alternating current vibrator 66 which is mounted on the face plate 58. As shown in FIG. 14, a bolt 67 is mounted on the face plate 58. The bolt 67 has an enlarged shank 68 which projects outwardly of the face plate 58. A support arm 69 of the vibrator 66 is provided with an opening 71 in which the shank 68 of the bolt 67 is received with the vibrator hanging loosely therefrom. When the vibrator 66 is energized, the hopper is agitated or shaken to cause chips 32 therein (FIG. 12) to progress downwardly and outwardly, as indicated in FIG. 4, to fall into the kettle 34.

The hopper is supported on a bracket 72 mounted on the upper frame 22. As shown in FIG. 15 the upper portion of the base plate 53 is provided with key slots 73. Lugs 74 mounted on the bracket 72 are received in the key slots 73 to support the hopper, the hopper being loosely supported thereby so that the entire hopper can be vibrated by the vibrator 66.

As shown in FIG. 12, the upper portion of the sidewall plate 52 is cut away as indicated at 75 to provide an opening through which food chips can be introduced into the hopper.

The kettle and baffle

From the hopper 33, the food chips 32 fall into the kettle 34 as shown in FIG. 4. The kettle 34 includes a main casting having side plates 76 and 77 (FIG. 5) spanned by sloping walls 78 and 79 (FIG. 4) and a horizontal bottom wall 81. Integral outwardly extending flanges 82 and 83 (FIG. 5) extend outwardly from the bottom edges of the side plates 76 and 77 respectively. Both inside and outside faces of the main casting can be coated with Teflon (polytetrafluoroethylene) to render them resistant to sticking or adhering and readily cleanable. Electric heating units 84 and 85 are mounted on the sloping walls 78 and 79 for heating oil in the kettle. Closure panels 86 and 87 are attached to and span the side plates 76 and 77 enclosing the heating units 84 and 85. A drain opening 88 is provided in the side plate 76 to which a drain pipe 89 and drain valve 90 are connected for discharging oil from the kettle. The kettle is mounted on the bottom plate 29. The kettle rests on a pad 91 of heat insulating material such as asbestos. Straps 92 and 93 attached to the bottom plate 29, overlie the flanges 82 and 83 of the kettle to hold it in position. A sight glass 94 indicates the height of oil in the kettle. Aligned openings 95 and 95' are formed in the pad 91 and in the bottom plate 29 to permit air to circulate under the kettle.

A transverse shaft 96 is rotatably mounted in the kettle above the level of oil therein. The shaft 96 is received in slots 96' and 96" (FIG. 18) in upper portions of the side plates 76 and 77 and is held in position by bearing brackets 97 and 98 attached to the side plates 76 and 77 respectively. A sprocket wheel 99 mounted on the shaft 96 is driven by a chain 101 to turn the shaft. Square blocks 102 are carried by the shaft 96 adjacent opposite side plates of the kettle. A sleeve 102' of square cross section is mounted on the blocks 102. The paddles 37 are mounted on the sleeve 102' to turn therewith. As shown in FIG. 16 each paddle 37 includes a main section 104, a portion of which is attached to the sleeve 102 and a portion of which extends outwardly from the sleeve 102' and a flange 105 at an outer end thereof. The outer end portions of the main sections and the flanges 105 dip into the oil in the kettle as the shaft 96 turns to pick up and raise cooked chips to the position shown at 32a in FIG. 4. The paddles are provided with perforations 106 (FIG. 5) through which oil can drain therefrom back into the kettle, one row of perforations 106' in each paddle being along the juncture line between the paddle and the sleeve 102, as shown in FIG. 17.

When the cooked chips reach the position 32a of FIG. 4, they are in front of a blower tube 39. Air is blown downwardly through the blower tube 39 by a blower 107 (FIGS. 1 and 2) which is mounted on the top plate 31 and is driven by an electric motor 108 which runs constantly when the machine is in operation. As shown in FIG. 1 the blower tube 39 is provided with an elbow 109, and air is discharged therefrom horizontally crosswise of the upper portion of the kettle to blow the cooked chips from the paddles in a horizontal direction. The discharge end of the blower tube 39 is mounted in a socket 110 (FIG. 18) in the side plate 76. The cooked chips are blown toward and against the baffle 41 (FIG. 3) which is in the path of the air blast from the blower tube 39. The chips can fall therefrom to the bottom plate 29. The baffle is supported by a strut 114 attached to the kettle 34 by fasteners 115 (FIG. 1) and by the downspout 43 which is attached to a lower corner of the baffle. The baffle is curved to catch cooked chips directed thereto. As shown in FIG. 8 the lower edge of the baffle is return bent to form the trough 42 which collects oil which can be entrapped on the cooked chips but separated therefrom at the baffle. A similar return bent portion 118 along the upper edge of the baffle catches oil which can be driven upwardly on the baffle. As shown in FIG. 6 the trough 42 slopes downwardly to a discharge end 119 overlying and discharging into the hollow downspout 43. The downspout directs the oil to be discharged through an opening 120 (FIG. 9) in the bottom plate 29. As shown in FIG. 7, the downspout 43 is provided with a tip 121 at its lower end. The tip can be received in an opening 122 in the bottom plate 29 to support the lower end of the downspout. Oil which is not discharged through the downspout 43 can be discharged through the openings 44 in the bottom plate 29. The tray 46 (FIG. 5) is mounted below the bottom plate 29 to receive the oil. The tray 46 runs on support bars 124 which are carried by the lower frame 23.

As shown in FIG. 7, a tab 126 is provided at the upper end of the downspout 43. The tab 126 is attached to the baffle 41 by a fastener 127 (FIG. 6), which is received in an opening 128 (FIG. 7) in the tab 126.

Drive connections and operation

The chain 101, which drives the paddle wheel 38, is driven by a motor 131 (FIG. 10) which is mounted on a motor mount bracket 132. The bracket 132, in turn, is mounted on the top plate 31. The motor 131 drives gears in a reduction gear box 130 (not shown in detail) which drives a shaft 133 which, in turn, carries a sprocket wheel 134 on which the chain 101 runs. The chain 101 extends downwardly from the sprocket wheel 134 through an opening 136 in top plate 31. A double-headed cam 137 is mounted on the shank of the sprocket wheel 134. A switch 138 is mounted on the bracket 132 and is provided with an actuator 139 (FIG. 11) engageable by the double-headed cam 137 so that the switch is actuated for a predetermined time for each half revolution of the sprocket wheel 134. The switch 138 is connected in series between a source of alternating current and the vibrator 66 (FIG. 12) so that, as the motor 131 (FIG. 10) drives the cam 137 (FIG. 2) and, through the chain 101, drives the paddle wheel 38, the hopper 33 is vibrated for predetermined intervals to cause advance of chips from the hopper 33 into the kettle 34. As the chips are cooked in hot oil in the kettle 34 and rise toward the top of the oil in the kettle 34 (FIG. 4), the cooked chips are picked up by the paddles 37 and of the paddle wheel 38, and, when raised above the level of the oil, the chips are blown by air from the blower pipe 39 against the baffle 41 to fall to the bottom plate 29, where the cooked chips can be collected for distribution. Any oil mist or the like which collects in the interior of the space between the plates 29 and 31 can be drawn out by a suction pump 141 (FIGS. 1 and 2) which is mounted on the top plate 29 and is driven by an electric motor 142. The suction pump 141 discharges through a vent pipe 143 (FIG. 1) which connects with an opening 144 in the hood. Electric lamps 146 can be provided for illuminating the hood.

The chip cooking machine illustrated in the drawings and described above is subject to structural modification without departing from the spirit and scope of the appended claims.

Having described our invention, what we claim as new and desire to secure by Letters Patent is:

1. A machine for cooking food chips which comprises a kettle, means for heating oil in the kettle, paddle means arranged to dip cooked chips out of oil in the kettle to transfer the cooked chips to a position spaced from said oil, and means for projecting an air blast transversely of said paddle means to discharge the chips therefrom.

2. A machine as in claim 1 wherein the air blast is projected substantially horizontally and an upright baffle is mounted in the path of the air blast and catches the chips.

3. A machine as in claim 2 wherein the baffle has a lower edge which slopes downwardly to a downspout and a trough is disposed along the lower edge of the baffle to direct oil which reaches the baffle downwardly into the downspout.

4. A machine as in claim 1 wherein a hopper is mounted adjacent the kettle and means is provided for advancing chips from the hopper to the kettle at predetermined intervals.

5. A machine as in claim 1 wherein the air blast is projected crosswise of and above oil in the kettle and the paddle raises the cooked chips above the oil and into alignment with the air blast.

References Cited

UNITED STATES PATENTS

| | | | |
|---|---|---|---|
| 2,150,273 | 3/1939 | Ferry | 99—405 |
| 2,174,555 | 10/1939 | Ferry | 99—405 |
| 2,921,713 | 1/1960 | Zanotto | 222—161 X |

WALTER A. SCHELL, *Primary Examiner.*

R. W. JENKINS, *Assistant Examiner.*